United States Patent Office 3,522,217
Patented July 28, 1970

3,522,217
POLYESTERS FROM p-BIS(HYDROXY-t-BU-
TYL)BENZENE AND p-BIS(HYDROXY-t-
BUTYL)BIPHENYL
Richard D. Weimar, Jr., Grifton, N.C., assignor to E. I.
du Pont de Nemours and Company, Wilmington, Del.,
a corporation of Delaware
No Drawing. Filed July 26, 1968, Ser. No. 747,820
Int. Cl. C07c 31/18; C08g 17/08
U.S. Cl. 260—75                                    7 Claims

ABSTRACT OF THE DISCLOSURE

Fiber-forming linear polyesters having a high degree of thermal stability characterized by recurring units of the structural formula

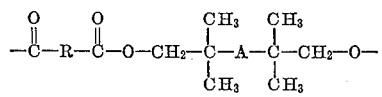

wherein A is a divalent aromatic radical selected from the group consisting of p-phenylene and p,p'-diphenylene, and R is a divalent organic radical of 6 to 20 carbon atoms and contains at least 1 aromatic nucleus.

BACKGROUND OF THE INVENTION

Field of the invention

This invention relates to a novel class of moldable linear polyesters, as well as to fibers, films, and other shaped articles produced therefrom, and is more particularly concerned with stable polyesters derived from a hindered aliphatic diol containing at least one aromatic ring in the diol molecule.

Description of the prior art

The early work on polyesters, such as that described by W. H. Carothers in U.S. 2,012,267, was directed primarily to polyesters prepared from aliphatic compounds. Such polyesters, as well as many polyesters derived from aromatic dicarboxylic acids such as the orthophthalate polyesters, are generally characterized by low melting points and very low softening points. Some of the polyesters are actually liquid at room temperature, while many others melt or at least soften below the boiling point of water. The investigations of Whinfield & Dickson, as described in U.S. Pat. 2,456,319, resulted in high-melting crystalline polyesters suitable for the production of textile fibers and films having many desirable properties. These polyesters are derived from straight-chain aliphatic diols and terephthalic acid, with the best known commercial example being polyethylene terephthalate. Attempts to prepare improved polyesters in which aromatic groups are included in the aliphatic diol molecule have usually resulted in disappointing properties. For example, many such polyesters are deficient in both hydrolytic stability and thermal stability. The present invention overcomes these deficiencies.

SUMMARY OF THE INVENTION

In accordance with this invention, it has been found that valuable linear polyesters may be prepared from p-bis-(hydroxy-t-butyl)benzene and p-bis-(hydroxy-t-butyl) diphenyl. Polyesters of this class are stable at temperatures above their melting points, have high second order transition temperatures, are relatively easily crystallizable, and may be molded or extruded into useful articles with desirable properties. They are particularly desirable because of their superior resistance to hydrolytic and thermal degradation. The novel linear polyesters of the invention may be illustrated as possessing recurring units of the following structural formula:

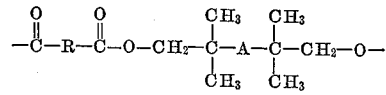

in which A is a divalent aromatic radical from the class consisting of phenylene and biphenylene, and R is a divalent organic radical containing from 2 to about 20 carbon atoms. Thus, R may be an arylene or aralkylene radical of 2 to about 20 carbon atoms derived from a dicarboxylic acid of the formula R(COOH)$_2$. Preferably R is an arylene group such as phenylene or diphenylene, or a radical in which two phenylene groups are connected by an aliphatic hydrocarbon chain, optionally with ether oxygen atoms present in the connecting chain. The polyesters are prepared by reacting the diol, p-bis-(hydroxy-t-butyl)benzene or p-bis-(hydroxy-t-butyl)diphenyl, or an ester-forming derivative thereof, with a suitable dicarboxylic acid or an ester-forming derivative thereof. Usually it is preferred that the linear polyester have an inherent viscosity of at least 0.3, as measured in solution at 25° C. in a 1:3 mixture of trifluoracetic acid and methylene chloride.

A convenient method for preparing the polyesters of the invention involves first carrying out an ester interchange reaction between the diol and an ester formed from the dicarboxylic acid and a low molecular weight monofunctional alcohol. During this reaction the monofunctional alcohol is liberated and distilled from the reaction mixture. Heating is continued for a suitable period of time with the final part of the heating being carried out at very low pressure. The ester interchange and polymerization may be carried out in the presence of a suitable catalyst such as a tetra-alkyl titanate, or a compound of the type NaHTi(OR)$_6$.

In the polymerization reaction, minor amounts (i.e., up to 10 mole percent) of other dihydroxy compounds and other dicarboxylic acids may be present. Suitable other dihydroxy compounds include ethylene glycol, 1,3-propanediol, 1,4-butanediol, 1,6-hexanediol, cyclohexanedimethanol, and bis(4-hydroxyethylcyclohexyl). Suitable other dicarboxylic acids include terephthalic, isophthalic, pimelic, sebacic, bibenzoic, and dodecanedioic acid.

DESCRIPTION OF PREFERRED EMBODIMENTS

The expression "polymer melt temperature" (PMT) employed with respect to the products of this invention is the minimum temperature at which a sample of the polymer leaves a wet molten trail as it is stroked with moderate pressure across a smooth surface of heated metal. "Polymer melt temperature" has sometimes in the past been referred to as "polymer stick temperature."

The concentration of free carboxyl groups in polyesters may be determined by the method of Pohl described in Analytical Chemistry, vol. 26, page 1614, October 1954.

The term "inherent viscosity" is used herein is defined by the expression $$\frac{\ln \eta r}{c}$$

where $\eta r$ is the ratio of the drop time of the solution to the drop time of the solvent, both measured at 25° C., and $c$ is the solution concentration of 0.32 gm. polymer per 100 ml. solution. The solvent used is a 1:3 (by volume) mixture of trifluoracetic acid and methylene chloride. Inherent viscosity is a measure of polymer molecular weight.

This invention is further illustrated but is not intended to be limited by the following examples in which parts and percentages are by weight unless otherwise specified.

Example I

The following procedure may be used to prepare p-bis-(hydroxy-t-butyl)benzene.

To a 5 liter flask equipped with stirrer, addition funnel and thermometer are added 750 ml. (8.41 moles) benzene and 145 ml. concentrated sulfuric acid. To this mixture is added, with vigorous stirring, over a 4 hr. period, 1650 ml. (16.8 moles) of methallyl chloride. The reaction temperature is maintained at 10–18° C. with an ice bath. After the addition is completed, the mixture is stirred at 7–15° C. for 1.5 hrs.

The reaction mixture is slowly poured into a stirred mixture of 1,000 ml. of ice cold water and 610 gm. of sodium carbonate, the organic layer separated, and the aqueous layer extracted with 200 ml. portions of ether. The combined organic layers are then dried with anhydrous magnesium sulfate. Evaporation of the ether on a steam bath leaves a brown oil which contains the mono- and disubstituted benzene. Fractional distillation of the oil gives 729 gm. of neophyl chlorid (boiling point, 71–73° C. and 0.45 mm.) and 833 gm. of crude p-bis-(chloro-t-butyl)benzene (boiling point, 130–133° C. at 0.40 mm.). The crystalline material which forms in the crude product is collected by filtration, washed with cold ethanol, and air dried to give 227 g. of pure dichloride having a melting point of 55° C.

In a 2 liter flask equipped with stirrer, addition funnel and reflux condenser are placed 50 ml. anhydrous ether, 38.4 g. (1.59 moles) of ether-washed magnesuim and 1 ml. ethylene bromide. A nitrogen atmosphere is maintained in the flask. The mixture is stirred and then a solution of 197 g. (0.760 mole) of p-bis-(chloro-t-butyl)benzene dissolved in anhydrous ether is added over a period of 3.5 hrs. When addition is complete, the mixture is heated to reflux for an additional 1.5 hrs. The mixture is cooled in an ice bath and oxygen is bubbled through the mixture for 1 hr. Then the mixture is poured into 210 ml. of concentrated hydrochloric acid containing 300 g. of ice and the aqueous mixture extracted with ether. Evaporation of the ether solution followed by recrystallization of the residual solid from toluene gives crude p-bis-(hydroxy-t-butyl)benzene having a melting point of 135–141° C. (sublimes). The solid is then extracted with hot water and recrystallized from toluene to give pure diol having a melting point of 160° C. (sublimes). A diol prepared in the above manner has the following analysis.

Calculated for $C_{14}H_{22}O_2$ (percent): C, 75.63; H, 9.98. Found (percent): C, 75.61; H, 9.96.

Example II

The following procedure may be used to prepare bis-4,4'-($\beta$-hydroxy-$\alpha,\alpha$-dimethyl)biphenyl.

In a solution of 23 parts potassium hydroxide in 200 parts water, in a 3-neck flask with a mechanical stirrer, reflux condenser, and an addition funnel, is dissolved 24 parts $\alpha$-(p-bromophenyl)isobutyric acid. After the addition of 4 parts 1% palladium on carbon, the mixture is heated to reflux. Then, during a period of 3 hrs., a solution of 40 parts methanol and 160 parts water is added very slowly, while a gentle reflux is maintained. After the addition is complete, the reaction mixture is refluxed for an additional hour. The hot solution is then filtered, cooled in ice, and acidified slowly, with stirring, with concentrated hydrochloric acid. The precipitate is filtered, dried, and recrystallized from a minimum amount of methanol to give the biphenyl derivative having a melting point of 278–279° C. The product is identified by infrared and mass spectra as $\alpha,\alpha,\alpha',\alpha'$-tetramethyl-4,4'-diphenylene diacetic acid. By treating with diazomethane, the acid is converted to the dimethyl ester for the next step in the procedure.

A solution of 50 parts of the ester prepared above in 1360 parts diethylether is added slowly to a solution of 14 parts lithium aluminum hydride in 900 parts diethylether. The mixture is refluxed for 5½ hrs. and then ethyl acetate is added to destroy the unreacted lithium aluminum hydride. Cold, dilute sulfuric acid is then added until the precipitated aluminum salt dissolves. The ether layer is separated, ether removed by evaporation, and the residue dissolved in methanol. The methanol solution is made basic with potassium hydroxide, treated with activated carbon, and then filtered hot. The filtrate is diluted while hot with water until crystals are formed, then the minimum amount of methanol added to redissolve the crystals. Upon cooling, a crystalline precipitate is formed which is collected and dried. The product, bis-4,4'-($\beta$-hydroxy-$\alpha,\alpha$-dimethylethyl)biphenyl is found to have a melting point of 169.5–170° C.

Example III

A polymer tube is charged with 4.9 g. (0.016 mole) of the dimethyl ester of bis-(p-carboxyphenyl)ethane-1,2; 4.52 g. (0.02 mole) p-bis(hydroxy-t-butyl)benzene and 5 drops of a solution prepared by dissolving 1 g. tetra-n-butyl-titanate in 200 ml. n-butyl alcohol. A nitrogen atmosphere is maintained in the tube. The tube is heated at 225–230° C. for 105 minutes with evolution of methanol. Then the temperature is steadily raised to 280° C. and the pressure reduced to 0.05 mm. mercury over a period of 10 minutes and these conditions maintained for 22 hrs. Upon cooling, the product is found to be a white crystalline solid having a DTA melting point at 208° C. (after heating at 150° C. 16 hrs. to crystallize) and an inherent viscosity of 0.55. A drawable, tenacious fiber is pulled from the melt. Second-order transition temperature, measured by differential thermal analysis, is 162° C.

Examples IV through VIII

Following the general procedure of Example III, with exceptions noted below, polyesters are prepared from p-bis(hydroxy-t-butyl)benzene and a series of aromatic dicarboxylic acids. In the preparation of polymers of Examples IV, VII and VIII, an additional step of solid-phase polymerization is used to obtain the desired molecular weight. The step involves grinding to 20 mesh the lower-molecular-weight polymer from melt polymerization and heating the ground solid polymer under a high vacuum for 16–24 hrs. at a temperature above 200° C. but below the melting point of the polymer, while passing a stream of nitrogen gas through the ground polymer. Inherent viscosity and polymer melting temperature are measured for each polymer, with the results shown in Table I.

TABLE I

| Example | Acid component | PMT, °C. | Inherent viscosity |
|---|---|---|---|
| IV | 4,4'-bibenzoic acid | 325 | 0.39 |
| V | bis(4-carboxyphenyl)ether | 230 | 0.43 |
| VI | 2,5-dimethylterephthalic acid | 112 | 0.34 |
| VII | Naphthalene-2,6-dicarboxylic acid | 308 | 0.42 |
| VIII | Terephthalic acid | 302 | 0.48 |

Example IX

Preparation of polyester from bis(hydroxy-t-butyl)biphenyl and bis(p-carboxyphenoxy)butane.

A polymer tube is charged with 10 g. (0.034 mole) of 4,4'-bis(hydroxy-tert-butyl)biphenyl, 10 g. (0.028 mole) of bis(p-carbomethoxyphenoxy)butane-1,4, and 8 drops (about 0.1 ml.) of a 12% solution of $NaHTi(OBu)_6$. Nitrogen is bubbled into the mixture through a small bore capillary. The tube is heated for 2.5 hrs. at 185–250° C. and then 2 hrs. at 280° C. The pressure is reduced to 0.1 mm. or less and polymerization is continued for about 22 hrs. at 275–280° C. Upon cooling, this polymer is found to have a PMT of 200° C., an inherent viscosity of 0.57 and a free carboxyl content of 0.0 eq./$10^6$ gms.

This polymer is press spun at 258° C. and drawn 3.3× at 105° C. The 20.6 denier yarn produced has a tenacity of 1.8 g.p.d. and an elongation of 18%.

Example X

Preparation of polyester from bis(hydroxy-t-butyl)biphenyl and bis(p-carboxyphenoxy)ethane.

A polymer tube is charged with 10 g. of 4,4'-bis(hydroxy-tert-butyl)biphenyl, 9.2 g. of bis(p-carbomethoxyphenoxy)ethane-1,2 and 10 drops (about 0.12 ml.) of 12% solution of $NaHTi(OBu)_6$. A nitrogen atmosphere is maintained by bubbling nitrogen slowly into the mixture through a small bore capillary. The temperature of the tube is slowly raised from 185° C. to 275° C. over a 3.5 hr. period. The pressure is then reduced to 0.1 mm. or less and maintained for 23 hrs. Upon cooling, this polymer has a PMT of 220° C. and an inherent viscosity of 0.52. A cold drawable, tenacious fiber is drawn from the molten polymer.

Example XI

Following the general procedure of Example IX, but using higher reaction temperatures and adding the solid-phase polymerization step of Example IV, 4,4'-bis(hydroxy-t-butyl)biphenyl is condensed with dimethyl terephthalate and polymerized to give a polymer having a PMT of 285° C. and an inherent viscosity of 0.28.

Example XII

Following the general procedure of Example IX, but using higher temperatures and adding the solid-phase polymerization step of Example IV, 4,4'-bis(hydroxy-t-butyl)biphenyl is condensed with bis(p-carbomethoxyphenyl)ethane-1,2 and polymerized to give a polymer having a PMT of 320° C. and an inherent viscosity of 0.30.

Example XIII

This example illustrates the superior thermal stability of polyesters of this invention when compared with the well-known commercial polyester, polyethylene terephthalate.

TABLE II

| Polymer | Inherent Viscosity | | | Free Carboxyls (eq./10⁵ g.) | | |
|---|---|---|---|---|---|---|
| | Before heating | After heating | Change | Before heating | After heating | Change |
| Comparison polymer | 0.88 | 0.50 | −0.38 | 30 | 204 | +174 |
| Test polymer | 0.46 | 0.48 | +0.02 | 0.0 | 25 | +25 |

A first glass tube is charged with polyethylene terephthalate (comparison polymer) having an inherent viscosity of 0.88, and a second tube is charged with the polyester derived from p-bis(hydroxy-t-butyl)benzene and bis(p-carboxyphenyl)ethane-1,2 (test polymer) having an inherent viscosity of 0.46. The two tubes are heated for 1 hr. at 200° C. with the pressure in the tubes maintained at approximately 0.1 mm. mercury. Then the temperature is raised over a period of 20 minutes to 330° C. and held at 330° C. for 1 hr. The molten polymers are allowed to cool under the reduced pressure and then removed and tested for change in viscosity and free carboxyl content. The results are shown in Table II above. The data in the table clearly indicate the superior thermal stability of the polyesters of this invention.

What is claimed is:

1. A linear polyester, having an inherent viscosity of at least 0.3, consisting essentially of recurring units represented by the structural formula

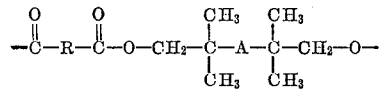

wherein A is a divalent aromatic radical selected from the group consisting of p-phenylene and p,p'-diphenylene, and R is a divalent organic radical of 6 to 20 carbon atoms and contains at least 1 aromatic nucleus, said inherent viscosity being measured at 25° C. in a solution of 0.32 gm. polymer per 100 ml. of a solution wherein the solvent is a 1:3 mixture of trifluoroacetic acid and methylene chloride.

2. The polyester as in claim 1 wherein R contains a p-phenyl or a p,p'-diphenyl radical.

3. A linear polyester, having an inherent viscosity of at least 0.3, composed of at least 90 percent of recurring units as defined in claim 1, said inherent viscosity being measured at 25° C. in a solution of 0.32 gm. polymer per 100 ml. of a solution wherein the solvent is a 1:3 mixture of trifluoroacetic acid and methylene chloride.

4. Fibers of the linear polyester defined in claim 1.

5. The fiber-forming linear polyester of a mixture consisting essentially of bis(p-carboxyphenyl)ethane-1,2 and p-bis(hydroxy-t-butyl)benzene.

6. The fiber-forming linear polyester of a mixture consisting essentially of p-bis(hydroxy-t-butyl)benzene and a diacid selected from the group consisting of 4,4'-bibenzoic acid, bis(4-carboxyphenyl)ether, 2,5-dimethylterephthalic acid, naphthalene-2,6-dicarboxylic acid and terephthalic acid.

7. The fiber-forming linear polyester of a mixture consisting essentially of 4,4'-bis(hydroxy-tert-butyl)biphenyl and a compound selected from the group consisting of bis(p-carbomethoxyphenoxy)butane-1,4', bis(p-carbomethoxyphenoxy)ethane-1,2, terephthalic acid and bis(p-carbomethoxyphenyl)ethane-1,2.

References Cited

UNITED STATES PATENTS 3,053,805  9/1962  Caldwell et al. _____ 260—47

WILLIAM H. SHORT, Primary Examiner

L. P. QUAST, Assistant Examiner

U.S. Cl. X.R.

260—31.2, 33.8, 47, 618